May 13, 1947.   F. W. H. MUELLER   2,420,610
ANTI-STATIC PHOTOGRAPHIC FILM
Filed Dec. 14, 1945

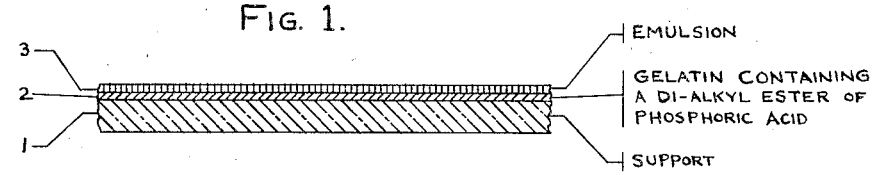

Fig. 1.
- EMULSION
- GELATIN CONTAINING A DI-ALKYL ESTER OF PHOSPHORIC ACID
- SUPPORT

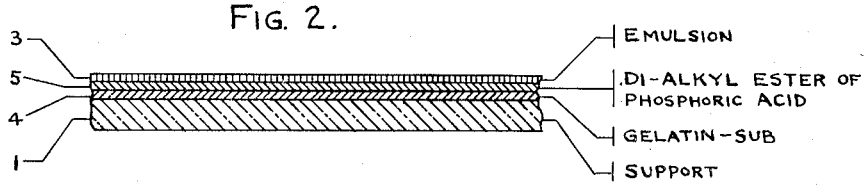

Fig. 2.
- EMULSION
- DI-ALKYL ESTER OF PHOSPHORIC ACID
- GELATIN-SUB
- SUPPORT

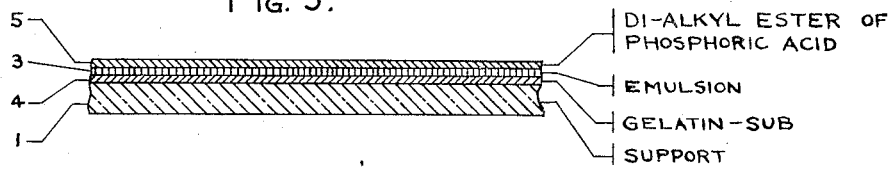

Fig. 3.
- DI-ALKYL ESTER OF PHOSPHORIC ACID
- EMULSION
- GELATIN-SUB
- SUPPORT

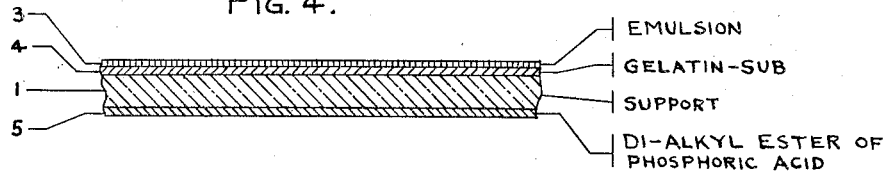

Fig. 4.
- EMULSION
- GELATIN-SUB
- SUPPORT
- DI-ALKYL ESTER OF PHOSPHORIC ACID

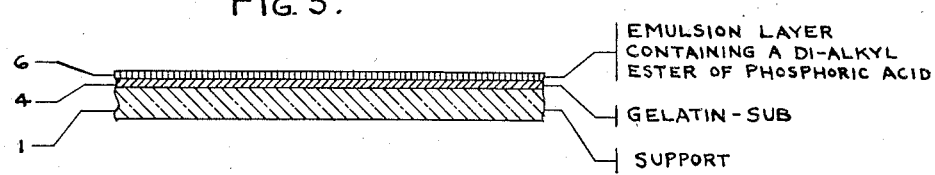

Fig. 5.
- EMULSION LAYER CONTAINING A DI-ALKYL ESTER OF PHOSPHORIC ACID
- GELATIN-SUB
- SUPPORT

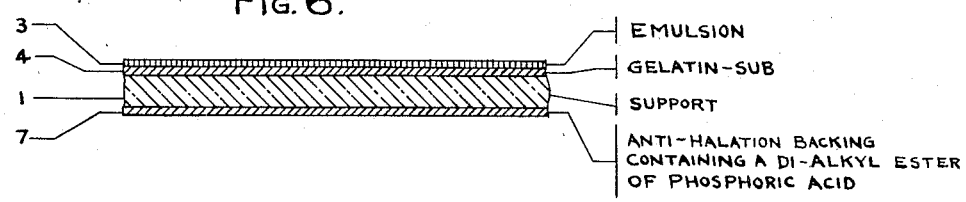

Fig. 6.
- EMULSION
- GELATIN-SUB
- SUPPORT
- ANTI-HALATION BACKING CONTAINING A DI-ALKYL ESTER OF PHOSPHORIC ACID

INVENTOR
FRITZ W. H. MUELLER
BY
ATTORNEYS

UNITED STATES PATENT OFFICE 2,420,610

ANTISTATIC PHOTOGRAPHIC FILM

Fritz W. H. Mueller, Binghamton, N. Y., assignor to General Aniline & Film Corporation, New York, N. Y., a corporation of Delaware Application December 14, 1945, Serial No. 635,047

12 Claims. (Cl. 95—9)

This invention relates to photographic film and more particularly to film having anti-static coatings.

Considerable difficulty has been encountered in the manufacture and use of photographic film due to the accumulation of electrical charges on the film. These electrical charges, which are known as static, develop when photographic film is handled during processing as, for example, when film sheets are separated from each other or when motion picture film is passed through a projector. The more serious difficulty is the accumulation of static in the application of the various coatings in the manufacturing process of the photographic film and in the passage of manufactured film through the camera. Manifestations of these charges are glow discharges which after development of the exposed film show up as black streaks or lines, or as irregular fogged patterns in the emulsion layer. Attempts have been made to overcome static in films by the application of substances which are electrolytes or possess hygroscopic properties. The function of these substances is to impart conductivity to the film and thus dissipate the electrical charges before their accumulation leads to local discharges. Many of these substances are incompatible with the materials which form one or more layers of the photographic film and introduce new manufacturing difficulties.

An object of the present invention is to provide means for eliminating static charges on a photographic film.

A further object is to provide means for reducing static charges in a photographic film base during coating of the sensitive silver-halide emulsion.

A still further object is to provide means for reducing static charges in a photographic film during passage through a camera or printer.

Further objects will appear hereinafter.

These objects are accomplished by the present invention by incorporating, in layers of the film or on the surface of the film, a di-alkyl ester of phosphoric acid of the following general formula:

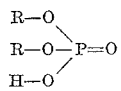

wherein one of the R's is a short chain alkyl group ranging from 1 to 5 carbon atoms, e. g., methyl, ethyl, propyl, isopropyl, butyl, isobutyl, amyl, isoamyl, and the like, and the other R represents an alkyl group ranging from 5 to 18 carbon atoms, e. g., butyl, isobutyl, amyl, isoamyl, hexyl, heptyl, octyl, nonyl, decyl, undecyl, dodecyl, tridecyl, tetradecyl, pentadecyl, heptadecyl, octadecyl, and the like.

Di-alkyl esters of phosphoric acid represented by the above general formula are commercially available, and the method of their preparation need not be described herein.

As suitable examples of di-alkyl esters of phosphoric acid, the following may be mentioned:

Methyl amyl hydrogen phosphate
Ethyl amyl hydrogen phosphate
Propyl octyl hydrogen phosphate
Butyl nonyl hydrogen phosphate
Amyl decyl hydrogen phosphate
Methyl dodecyl hydrogen phosphate
Ethyl dodecyl hydrogen phosphate
Ethyl tetradecyl hydrogen phosphate
Methyl hexadecyl hydrogen phosphate
Methyl octadecyl hydrogen phosphate
Ethyl octadecyl hydrogen phosphate These esters may be applied to the film in various ways to eliminate static. As for example, they may be applied as a constituent of a sub-layer or as a coating over a sub-layer; to the finished film either on the obverse surface, reverse surface or to the light-sensitive emulsion; or to either surface of the exposed and processed film. The various modes of applying these esters will now be described with reference to the accompanying drawing.

In the accompanying drawing Figs. 1 to 6, inclusive, represent sectional views of a film provided with anti-static layers in accordance with the present invention.

As shown in Fig. 1 a film base of transparent material such as a cellulose organic ester, for example, cellulose acetate, cellulose formate, cellulost proprionate, cellulose butyrate, cellulose acetate-propionate, cellulose acetate-butyrate, and the like, or cellulose nitrate, or film-forming polymers, such as polyvinyl chloride, copolymers of vinyl chloride-vinyl acetate, copolymers of vinyl chloride-vinylidene chloride, polyamides, superpolymers and the like, is coated with a thin gelatin sub-layer 2 to which has been added one of the di-alkyl esters of phosphoric acid referred to above. The light-sensitive emulsion layer 3 is coated directly over this gelatin sub-layer.

In the modification shown in Fig. 2, the base 1 is coated with the usual gelatin sub-layer 4 and directly over this layer is coated a solution of one of said di-alkyl esters of phosphoric acid 5. The light-sensitive emulsion layer 3 is coated directly over the layer 5.

In Fig. 3 the support 1 is coated with the usual gelatin sub-layer 4 and the light-sensitive emulsion layer 3. The anti-static layer 5 consisting of a solution of such di-alkyl ester of phosphoric acid is coated over the light-sensitive emulsion layer 3.

The anti-static layer 5 may be applied to a film base 1 opposite to that bearing the usual gelatin sub-layer 4 and light-sensitive emulsion layer 3 as shown in Fig. 4.

In Fig. 5 the support 1 is coated with the usual gelatin sub-layer 4. Over this sub-layer is coated a light-sensitive emulsion layer 6 containing such di-alkyl ester of phosphoric acid.

In Fig. 6 the base 1 is coated with the usual gelatin sub-layer 4 and light-sensitive emulsion layer 3. The anti-halation layer 7 containing one of said di-alkyl esters of phosphoric acid is coated on the opposite side of the film base 1.

The di-alkyl esters of phosphoric acid may be applied to the film either in a solvent or in a non-solvent for the film base. Where the ester is applied in admixture with a light-sensitive emulsion, or beneath the sensitive layer or over the sensitive layer, it is applied either in an aqueous solution or some other suitable solvent which does not adversely effect the light-sensitive emulsion, such as for example, methyl or ethyl alcohol and the like. In employing the di-alkyl esters of phosphoric acid as a backwash, they may be applied to the film base in a solvent such as methanol, acetone or a mixture thereof, or in a 1.5% solution of gelatin, or an alkali soluble resin prepared according to United States Patent 2,089,764.

The following specific examples illustrate several of the various methods of applying these dialkyl esters of phosphoric acid as anti-static coatings, and it will be understood that these examples merely represent the preferred embodiments and are not to be considered as limitative.

*Example I*

10.0 cc. of a 5% solution of methyl dodecyl hydrogen phosphate in methanol are dispersed in 500 cc. of 1.5% gelatin and applied as a top layer upon a light-sensitive silver-halide emulsion.

*Example II*

5.0 grams of ethyl tetradecyl hydrogen phosphate are dissolved in 95 cc. of a mixture consisting of 30% methanol and 70% acetone. To the solution was then added 0.2 gram of a resin from prepared phenoxyacetic acid and formaldehyde according to Example 2 of United States Patent 2,089,764. The resulting solution is then applied directly upon a cellulose acetate base.

*Example III*

5.0 grams of ethyl octadecyl hydrogen phosphate and 0.2 gram of cellulose acetate having an acetic acid content of about 59% are dispersed in 95 cc. of a mixture consisting of 30% methanol and 70% acetone. This dispersion is applied as a backwash upon a cellulose nitrate base.

*Example IV*

100 cc. of a 10% solution of methyl dodecyl hydrogen phosphate in methanol are mixed with 10 kilograms of a silver-halide emulsion (containing 4-5% silver-halide) and coated over a gelatin-subbed cellulose acetate base.

*Example V*

100 cc. of a 10% solution of ethyl dodecyl hydrogen phosphate in methanol are dispersed in 500 cc. of a 1.5% aqueous solution of gelatin. This dispersion is coated as a top layer upon a light-sensitive silver-halide emulsion layer.

The above specific examples are to be regarded as merely illustrative of the invention, and not in any sense restrictive. It will be obvious to anyone skilled in the art that many modifications such as substituting equivalent material and varying the proportions of materials used are within the spirit and scope of the invention as defined in the appended claims.

I claim:

1. A photographic element comprising a support carrying a photographic emulsion layer and an anti-static layer comprising a di-alkyl ester of phosphoric acid corresponding to the following general formula:

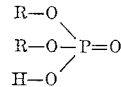

wherein one of the R's is a short chain alkyl group ranging from 1 to 5 carbon atoms, and the other R represents an alkyl group ranging from 5 to 18 carbon atoms.

2. A photographic element comprising a support carrying a photographic emulsion layer and an anti-static layer comprising methyl dodecyl hydrogen phosphate.

3. A photographic element comprising a support carrying a photographic emulsion layer and an anti-static layer comprising ethyl tetradecyl hydrogen phosphate.

4. A photographic element comprising a support carrying a photographic emulsion layer and an anti-static layer comprising ethyl octadecyl hydrogen phosphate.

5. A photographic element comprising a support carrying a photographic emulsion layer and between said support and said emulsion layer, an anti-static layer comprising a dialkyl ester of phosphoric acid corresponding to the following general formula:

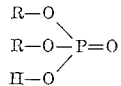

wherein one of the R's is a short chain alkyl group ranging from 1 to 5 carbon atoms and the other R represents an alkyl group ranging from 5 to 18 carbon atoms.

6. A photographic element comprising a support carrying a photographic emulsion layer and, on the opposite side of said support, an anti-static layer comprising a dialkyl ester of phosphoric acid corresponding to the following general formula:

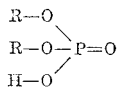

wherein one of the R's is a short chain alkyl group ranging from 1 to 5 carbon atoms and the other R represents an alkyl group ranging from 5 to 18 carbon atoms.

7. A photographic element according to claim 5 in which the anti-static layer comprises methyl dodecyl hydrogen phosphate.

8. A photographic element according to claim 5 in which the anti-static layer comprises ethyl tetradecyl hydrogen phosphate.

9. A photographic element according to claim 5 in which the anti-static layer comprises ethyl octadecyl hydrogen phosphate.

10. A photographic element according to claim 6 in which the anti-static layer comprises methyl dodecyl hydrogen phosphate.

11. A photographic element according to claim 6 in which the anti-static layer comprises ethyl tetradecyl hydrogen phosphate.

12. A photographic element according to claim 6 in which the anti-static layer comprises ethyl octadecyl hydrogen phosphate.

FRITZ W. H. MUELLER.